July 10, 1951 C. A. GARBER 2,560,431
SEEDER ATTACHMENT FOR TRACTORS
Filed March 23, 1946 2 Sheets-Sheet 1

INVENTOR.
Clark A. Garber
BY
Marechal & Biebel
ATTORNEYS

July 10, 1951 C. A. GARBER 2,560,431
SEEDER ATTACHMENT FOR TRACTORS
Filed March 23, 1946 2 Sheets-Sheet 2
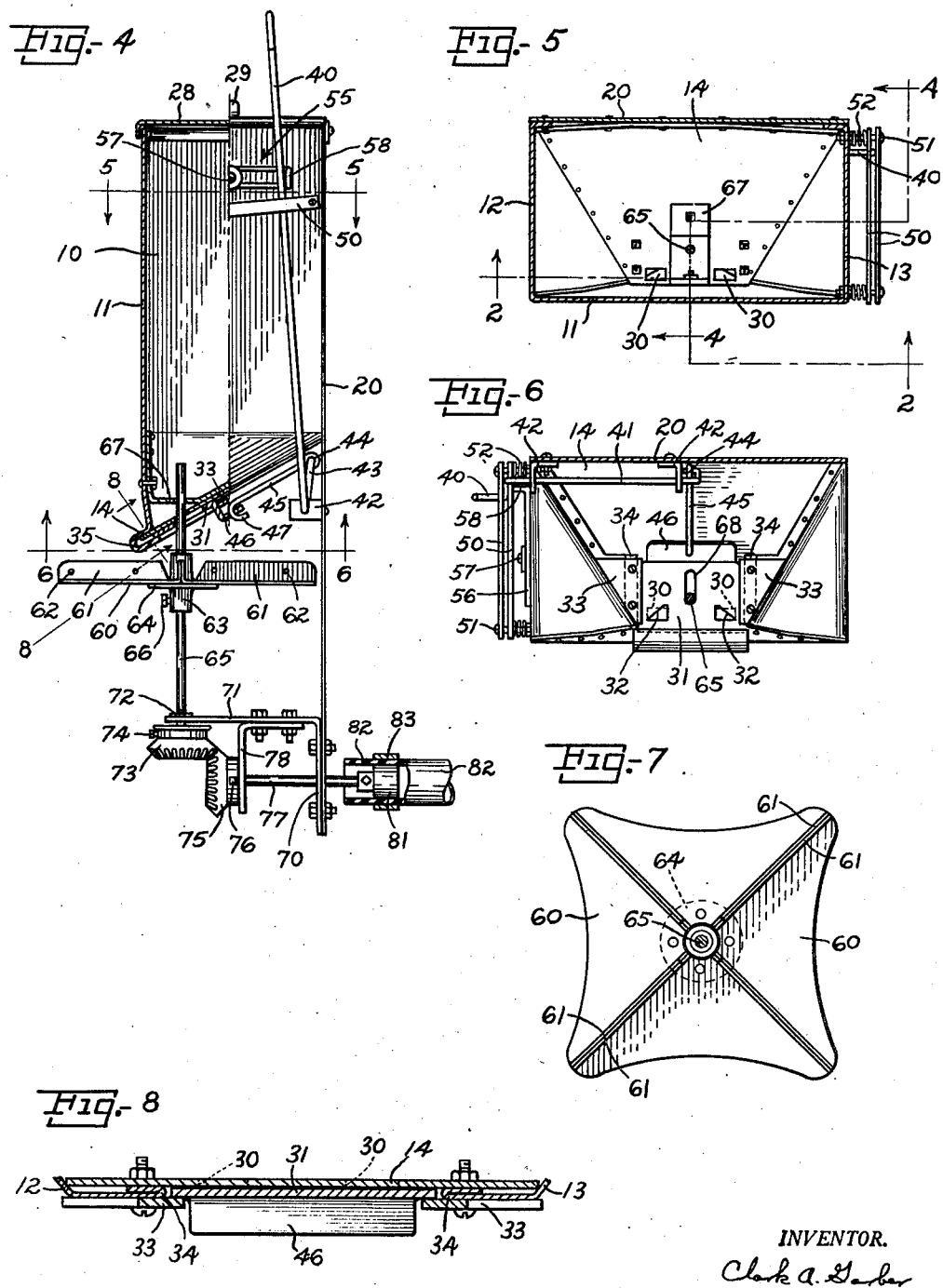
INVENTOR.
Clark A. Garber
BY
Marechal Biebel
ATTORNEYS Patented July 10, 1951

2,560,431

UNITED STATES PATENT OFFICE 2,560,431

SEEDER ATTACHMENT FOR TRACTORS

Clark A. Garber, St. Paris, Ohio

Application March 23, 1946, Serial No. 656,583

5 Claims. (Cl. 275—8)

This invention relates to devices for seeding, and more particularly to a broadcast seeder adapted for mounting on a tractor.

One of the principal objects of the invention is to provide a broadcast seeder of simple and inexpensive construction which can be readily mounted on a tractor and placed in driving connection with the power take-off of the tractor.

Another object is to provide such a broadcast seeder which can be readily formed of sheet metal and wherein the driving and controlling mechanisms are supported from a single panel of sheet metal which forms one side of the seed hopper.

It is also an object of the invention to provide such a seeder which may be connected to the power take-off of a tractor through a hose or like flexible coupling and which can thus operate effectively irrespective of the shaking or like rough treatment encountered in use on irregular terrain.

A further object is to provide a broadcast seeder having a simple and effective valve mechanism for controlling the rate at which seed is discharged from the hopper and convenient controls for the valve which are readily and accurately manipulated from the driver's seat of a tractor whereon the seeder is mounted.

Other objects and advantages of the invention will be apparent from the following description, the accompanying drawings and the appended claims.

In the drawings, in which like characters of reference designate like parts throughout—

Fig. 4 is a view partly in side elevation and partly in vertical section and taken at right angles to Fig. 2 as shown by the line 4—4 in Fig. 5;

Fig. 5 is a horizontal section through the hopper taken on the line 5—5 in Fig. 4;

Fig. 6 is a view of the bottom of the hopper showing the outlets for seed and the control mechanism therefor, the view being taken on the line 6—6 in Fig. 4;

Fig. 7 is a detail view in plan of the seed broadcasting disk; and

Fig. 8 is an enlarged detail view taken through the valve mechanism for the hopper outlet substantially on the line 8—8 in Fig. 4.

Figure 1:
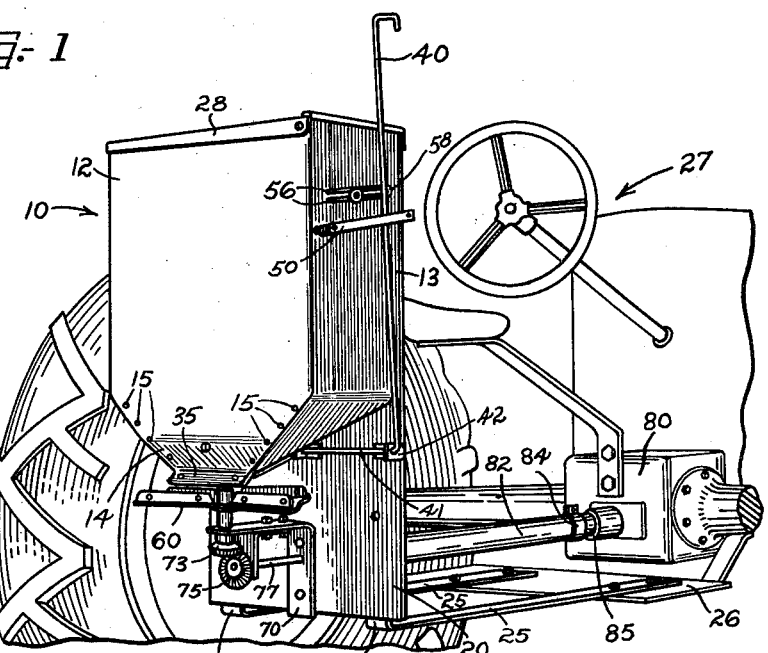
Fig. 1 is a more or less diagrammatic perspective view illustrating a seeder embodying a preferred form of the invention and shown mounted on a tractor and connected for operation.

In the preferred embodiment of the invention shown in the drawings, the hopper for seed is indicated generally by the reference character 10 and is formed of a plurality of panels of a suitable sheet metal such as galvanized iron. As shown, one of these panels is bent over to form three of the side walls 11, 12 and 13 of the hopper, wall 11 being for convenience referred to hereinafter as the front wall of the hopper although in operation it will normally face rearwardly as shown in Fig. 1. The bottom of the hopper is formed by cutting the lower portions of these side walls apart at their connecting corners and bending the resulting sheet portions together to outline a generally funnel shape for the hopper bottom. A panel 14 having the general outline of an equilateral trapezoid is supported by these inwardly bent wall portions to complete the bottom of the hopper, and as shown, this bottom panel 14 slopes inwardly and forwardly towards wall panel 11. The joints between these sheet members may be soldered, welded or otherwise secured togther as by rivets as indicated at 15.

Figure 2:
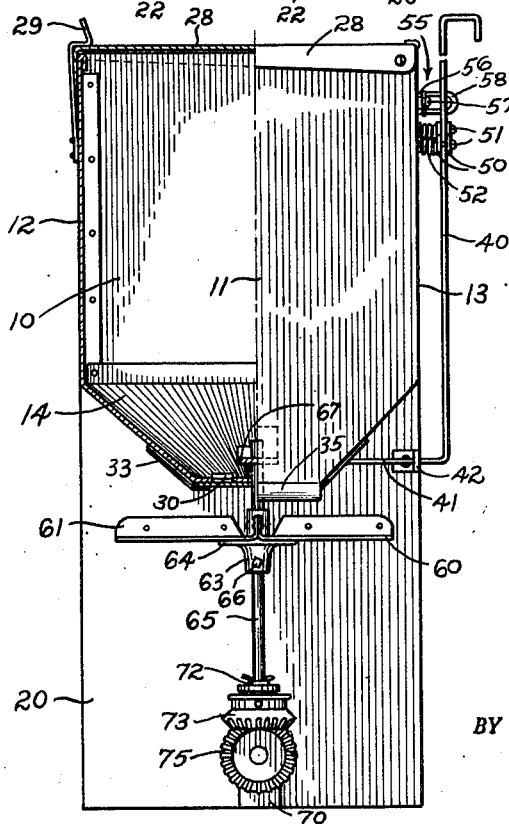
Fig. 2 is a view partly in elevation and partly in vertical section of the seeder shown in Fig. 1, the view being taken on the line 2—2 in Fig. 5.
Figure 3:
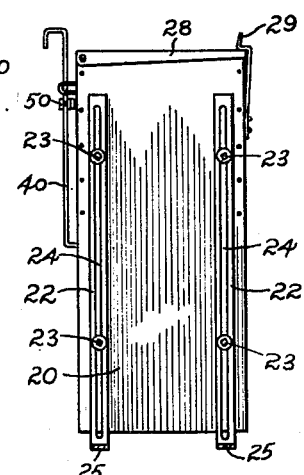
Fig. 3 is a rear elevation of the seeder shown in Figs. 1 and 2, the view being on a reduced scale with respect to Fig. 2.

The rear wall of the hopper 10 is provided by a panel 20 which is of generally rectangular shape and extends for a substantial distance below the bottom of the hopper, as shown particularly in Figs. 2 and 4, and which is secured to the flanged rearward edges of wall portions 12 and 13 and bottom panel 14, as by riveting or welding. This panel 20 provides support both for the operating and control mechanisms of the device, as will be described, and also for the means for mounting the device on a tractor. As shown, two vertical bar members 22 are positioned on the outside of panel 20 and are secured thereto by means of bolts 23 which engage in longitudinal slots 24 in the bars. These bars are in turn integrally formed with or otherwise secured to horizontally extending bar portions 25 which are adapted to be bolted or otherwise connected to the footboard 26 of the tractor shown fragmentarily at 27 in Fig. 1. A suitable cover 28 for hopper 10 may be pivotally mounted at one side of the hopper and provided with suitable releasable locking means such as the spring catch 29 shown at the end opposite its pivotal mounting.

A discharge outlet for seed from hopper 10 is provided by one or more apertures 30 adjacent the front of bottom panel 14 and substantially at the lowest part of the hopper bottom, these apertures being shown in Figs. 5 and 6 as rectangular in shape. Adjustable valve means for controlling discharge through apertures 30 is provided by a plate member 31 of sheet metal mounted for sliding movement with respect to these apertures 30 and having apertures 32 adapted upon sliding movement of member 31 to register with apertures 30. These apertures 32 are shown as generally triangular, thus providing for substantial variation of the cross-sectional area of the passage provided by the coincident portions of apertures 30 and 32 to accommodate seeds of different sizes and to control the rate at which seed is discharged from the hopper.

The mounting means for valve member 31 is shown most clearly in Figs. 4, 6 and 8. Two plate members 33 are secured at opposite sides of the bottom of the hopper and spaced from bottom panel 14 to provide guideways for sliding movement of member 31, convenient spacing means being provided by turning over the inner edges of the downwardly extending portions of side walls 12 and 13, these turned over edges being clearly shown at 34 in Fig. 8 and serving also to limit angular movement of valve 31. Also, the bottom edge 35 of front wall member 11 is turned over in a reverse curve to form a combined guideway and front stop for valve member 31, as best seen in Fig. 4. With this construction, convenient results are obtained by having apertures 32 spaced from the front edge of this valve 31 so that when the valve is at the limit of its forward travel as determined by the turned over lower portion 35 of front wall 11, apertures 32 will be wholly out of register with apertures 30 so that no seed will be discharged from the hopper.

This invention also provides convenient means for manual control and adjustment of valve member 31. An elongated lever arm 40 is mounted for convenient manipulation from the driver's seat of tractor 27 and extends generally upwardly from one end of a rod portion 41 which forms a shaft for lever 40 and is mounted for pivotal movement on the downwardly extended portion of wall panel 20 by means such as angle brackets 42 bolted or otherwise secured to panel 20. Rod or shaft 41 is extended radially at its other end to form a crank arm 43 which is pivotally secured at 44 to one end of a link member 45, the other end of which is connected to valve member 31. As shown, valve 31 is formed at its rearward edge with a flange portion 46 having an aperture therein and link 45 has its front end 47 hooked to engage in this aperture. With this arrangement, the discharge outlet will be closed when lever 40 is at the limit of its motion away from panel 20 and acts to open valve 31 as it is drawn towards panel 20.

There is also provision for frictionally holding lever arm 40 in any desired position and an adjustable stop limiting the motion of this arm in opening valve 31. A pair of metal bars 50 is mounted on hopper wall 13 by means of bolts 51 and springs 52, the latter being positioned between the hopper wall and the inner bar 50 for resiliently urging the straps together. Lever 40 is passed between these bars 50 and forces them apart against the urging of springs 52, so that the springs thus exert pressure at all times on the lever through bar 50 and thus act to hold the lever against accidental displacement. This holding device is so constructed and arranged that the pressure of springs 52 on lever 40 will prevent accidental opening of the discharge outlet but will permit the lever to be moved readily when the operator so desires.

In order also to provide a positive stop for lever 40 limiting its motion opening the valve, a stop member 55 is mounted on hopper wall 13 adjacent bars 50. As shown, this member 55 comprises a rod bent back on itself to provide two parallel portions 56 spaced apart by an amount sufficient to receive a bolt 57 which with a suitable washer secures member 55 to the hopper wall. One end 58 of member 55, shown as the looped end of the bent-over rod, is bent outwardly substantially at right angles to the parallel rod portions 56 to provide a stop against which lever 40 is adapted to abut when moved to open valve member 31 and the discharge outlet of the hopper. With this arrangement, member 55 may readily be adjusted on hopper wall 13 to position the stop portion 58 to stop lever 40 at a desired predetermined position in which the coincident portions of discharge apertures 30 and 32 will give the desired total cross-sectional discharge area for the rate of discharge desired for the particular seed being used.

A seed-broadcasting disk 60 is positioned for rotation below the discharge outlet of the hopper and provided with means for rotating it to spread the seed discharged from the hopper in the desired broadcast fashion. As shown particularly in Figs. 1 and 7, disk 60 is formed from four generally triangular sectors having their adjacent edges flanged upwardly at 61 and secured together by bolts or rivets 62 passing through these flanges 61. Flanges 61 thus not only provide convenient means for assembling disk 60 but also serve, when the disk is rotated, to catch the seed as it is discharged from the hopper and transmit to it the desired centrifugal force for broadcast spreading.

A collar 63 is positioned centrally of disk 60 and includes a flanged portion 64 which provides convenient means for securing, as by riveting, the disk and collar together. This collar is in turn supported for rotation with a shaft 65 arranged substantially vertically with respect to hopper 10 and below the discharge outlet therefrom, collar 63 being provided with a set screw 66 for adjustable locking to shaft 65. The upper end of shaft 65 extends into hopper 10 and passes through a short metal strap 67, which is bolted to bottom panel 14 and the downwardly extended portion of front wall 11, as shown in Figs. 4 and 5, and serves both to reinforce the bottom of the hopper and to locate the upper end of shaft 65 and support it against motion at an angle to its axis. Valve member 31 is provided with a slot 68 through which shaft 65 passes, thus permitting the desired movement of the valve without interference by shaft 65, and the length of this slot 68 may be made such that it will combine with shaft 65 to provide maximum end limits to the motion of valve 31 in addition to the other stop means described. The lower end of shaft 65 is supported on a right angled bracket which includes a vertical arm portion 70, which is bolted or otherwise secured to the downwardly extended portion of panel 20, and another arm portion 71 extending outwardly from panel 20 to a position below the discharge outlet from the hopper. The outer end of bracket arm 71 has a hole through which shaft 65 extends, and the shaft is rotatably supported on the upper surface of arm 71 by means such as a washer and cotter pin as shown at 72.

The driving means for broadcasting disk 60 includes a bevel gear 73 secured by set screw 74 to the lower end of shaft 65 below bracket arm 71 and meshing with a similar beveled gear 75 secured by set screw 76 to a shaft 77, which is rotatably supported by the downwardly extended arm of a second and smaller right angled bracket 78 bolted or otherwise secured to bracket arm 71. Shaft 77 extends through properly registered holes in bracket arm 70 and the downwardly extended portion of panel 20 and is provided with a driving connection to the power take-off 80 of tractor 27. As shown, the end of shaft 77 opposite gear 75 carries a collar 81 adapted for insertion in one end of a flexible coupling 82 such as a rubber hose, and is connected thereto by a hose clamp 83. This hose 82 may be standard radiator base of a suitable diameter such as 2 inches and its opposite end is shown as connected by a clamp 84 to the shaft 85 extending from power take-off 80.

This seeder device has a variety of advantageous structural and operational features. It is simple and inexpensive to construct and to mount for operation on a tractor, and it has considerable flexibility from the standpoint of adaptation to tractors of different types and sizes. The device may readily be adjusted vertically to the proper height for connection to the power take-off of the tractor, such adjustment merely requiring the manipulation of the bolts 23 which secure vertical bars 22 to wall panel 20. The mounting mechanism is constructed for quick mounting or removal, and the driving connection is similarly easy, requiring only the engagement of the flexible hose to the standard power take-off shaft and the tightening of hose clamp 84, no special tools or connecting members being needed. This hose connection may be quite long, for example three to four feet or more, and by reason of its flexibility eliminates the necessity for strict axial alignment between shaft 77 and the power take-off shaft 85. These shafts may be laterally or vertically offset or even relatively tilted without adversely affecting the operation of the device. In addition, the flexible coupling acts to prevent transmission of vibration between the seeder and tractor, thus further providing for smooth and easy operation.

The lever by which the discharge outlet is opened and closed is easily reached for manual operation from the driver's seat of the tractor, as is clearly seen in Fig. 1. Also, it is a simple matter to adjust stop member 55 before beginning the sowing operation to provide for a maximum valve opening in accordance with the desired rate and thickness of seeding for the particular seed being used. Then in the field bar 50 and springs 52 will act to prevent the valve from opening accidentally as well as to hold it at a desired intermediate open position, and stop 55 will prevent the valve from opening beyond the predetermined maximum amount.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A seeder of the character described comprising, in combination, a hopper for seed, a panel of sheet metal forming one side of said hopper and extending below the bottom thereof, means secured to said panel for mounting said hopper upon a tractor, the bottom of said hopper having therein a discharge outlet for seed, a valve controlling said discharge outlet, a handle pivotally mounted upon said hopper for manipulating said valve, a right angled bracket having one arm secured to said panel and the other arm extended below said discharge outlet, a seed-broadcasting disk mounted in said extending bracket arm for rotation about a substantially vertical axis below said outlet, an arm member extending downwardly from said extending bracket arm in substantially parallel spaced relation with the arm of said bracket secured to said panel, a shaft rotatably supported in said parallel arms and extending through said panel, a geared connection between one end of said shaft and said disk, and a flexible driving connection between the other end of said shaft and the power take-off of said tractor to rotate said disk for broadcasting seed from said hopper.

2. A seeder of the character described comprising, in combination, a plurality of panels secured together and forming a hopper for seed, the bottom of said hopper having therein a discharge outlet for seed, a valve member mounted for sliding movement with respect to said outlet to control discharge of seed through said outlet, a crank mounted for pivotal movement upon one of said panels for operating said sliding valve member, a link member connecting said crank to said sliding valve member, a lever for operating said crank and extending upwardly therefrom, a pair of parallel bar members mounted upon one of said panels, spring means resiliently urging said bar members together, said lever engaging between said bar members in such position as to be gripped therebetween under the urging of said spring means for frictionally holding said lever against accidental motion to retain said sliding valve member in predetermined position with respect to said outlet, a seed-broadcasting disk positioned below said outlet, means supporting said disk for rotation about a substantially vertical axis, means for mounting said seeder upon a tractor, and a driving connection between said disk and the power take-off of said tractor to rotate said disk for broadcasting seed from said hopper.

3. A seeder of the character described adapted for use with a tractor having a power take-off, comprising a hopper for seed, a panel of sheet metal forming one side of said hopper and extending below the plane of the bottom of said hopper, means for mounting said hopper upon the tractor, the bottom of said hopper having therein a discharge outlet for seed, a valve controlling said discharge outlet, a handle pivotally mounted upon said hopper for manipulating said valve, a bracket secured to said panel and including a horizontal portion extending rearwardly below said discharge outlet, a seed-broadcasting disk mounted on a vertical shaft journaled in said extending bracket portion for rotation about a substantially vertically axis below said outlet, a horizontal drive shaft for said disk located below said disk and in driving relation therewith through said vertical shaft, and means fixed to said extending portion of said bracket and spaced rearwardly from said panel and cooperating therewith to support said drive shaft with the forward end of said shaft extending through said panel for ready connection with the power take-off of said tractor.

4. A seeder of the character described adapted for use with a tractor having a power take-off, comprising a hopper for seed, a panel of sheet metal forming one side of said hopper and extending below the plane of the bottom of said hopper, the bottom of said hopper having therein a discharge outlet for seed, a valve mounted for sliding movement with respect to said outlet to control the discharge of seed therethrough, a handle for said valve, means supporting said handle on said hopper with the upper end of said handle located for convenient manipulation by the operator of the tractor, a pair of parallel bar members mounted upon said hopper adjacent said handle, means resiliently urging said bar members together, said handle engaging between said bar members in such position as to be gripped therebetween by the urging of said resilient means for frictionally holding said handle against accidental motion to retain said sliding valve in predetermined position with respect to said outlet, a seed-broadcasting disk positioned below said outlet, means including a bracket secured to said downwardly extending panel and a shaft mounted on said bracket for supporting said disk for rotation about a substantially vertical axis, means for mounting said seeder upon the tractor, and means supported by said panel and adapted to be connected with the power take-off of said tractor for driving said disk through said shaft.

5. A seeder of the character described adapted for use with a tractor having a power take-off, comprising a hopper for seed, a panel of sheet metal forming one side of said hopper and extending below the plane of the bottom of said hopper, means for mounting said hopper upon the tractor, the bottom of said hopper having therein a discharge outlet for seed, a valve controlling said discharge outlet, means supporting said valve for sliding movement with respect to said outlet to control the discharge of seed through said outlet, operating means for said valve, a seed-broadcasting disk, means including a bracket secured to said panel and a shaft carried by said bracket for supporting said disk for rotation about a substantially vertical axis below said outlet, said shaft including a portion extending into said hopper and through said sliding valve for cooperation with said valve to maintain said valve in alignment with said outlet.

CLARK A. GARBER.

REFERENCES CITED

The following references are of record in the file of this patent:

UNITED STATES PATENTS

| Number | Name | Date |
|---|---|---|
| 253,285 | Henris | Feb. 7, 1882 |
| 920,974 | Miller | May 11, 1909 |
| 1,751,928 | Lachner | Mar. 25, 1930 |
| 1,806,936 | Finnell | May 26, 1931 |
| 1,965,483 | Woods | July 3, 1934 |
| 2,124,198 | Kriegbaum et al. | July 19, 1938 |
| 2,293,977 | Hoffstetter | Aug. 25, 1942 |
| 2,334,376 | Bauer | Nov. 16, 1943 |

FOREIGN PATENTS

| Number | Country | Date |
|---|---|---|
| 5,715 | Great Britain | May 28, 1914 |
| 327,965 | Great Britain | Apr. 14, 1930 |